United States Patent [19]

Ulbing

[11] Patent Number: 4,836,514
[45] Date of Patent: Jun. 6, 1989

[54] PRELOADED SPRING, METHOD AND APPARATUS FOR FORMING SAME

[75] Inventor: Otmar M. Ulbing, Fairport, N.Y.

[73] Assignee: Windwinder Corporation, Tipp City, Ohio

[21] Appl. No.: 141,961

[22] Filed: Jan. 11, 1988

Related U.S. Application Data

[62] Division of Ser. No. 814,234, Dec. 30, 1985, Pat. No. 4,719,683.

[51] Int. Cl.$^4$ ............................................. F16F 1/06
[52] U.S. Cl. ..................................... 267/166; 29/173; 72/145; 140/89
[58] Field of Search ....................... 267/166, 286, 289; 29/173; 72/145, 183, 371; 140/89, 103

[56] References Cited

U.S. PATENT DOCUMENTS

| | | | |
|---|---|---|---|
| 1,676,598 | 7/1928 | Bleuel | 72/132 |
| 2,248,440 | 7/1941 | Schmid | 153/65 |
| 2,495,212 | 1/1960 | De Vries et al. | 153/67 |
| 3,342,052 | 9/1967 | Boy | 72/138 |
| 4,424,624 | 1/1984 | Sievers | 29/727 |

Primary Examiner—George E. A. Halvosa
Attorney, Agent, or Firm—Bean, Kauffman & Spencer

[57] ABSTRACT

A closely wound, coil type tension spring of one hand having an initial tension exceeding that obtainable by prior spring forming techniques is formed by reverse winding an open-wound compression spring of the opposite hand. Alternative methods and apparatus for forming the tension spring are disclosed.

12 Claims, 3 Drawing Sheets

PRELOADED SPRING, METHOD AND APPARATUS FOR FORMING SAME

CROSS REFERENCE TO RELATED APPLICATION

This application is a division of application Ser. No. 814,234, filed Dec. 30, 1985. now U.S. Pat No. 4,719,683.

BACKGROUND OF THE INVENTION

It is known that during a tension spring forming operation, a twist may be introduced in the spring wire, such that adjacent coils tend to press against one another and resist subsequent deflection of the spring. A spring of this type is considered to have an "initial tension" or a "pre-load" (Pi), which must be overcome by a tension force applied to the spring before the spring coils will open or separate The amount of initial tension present in a tension spring, which is formed of a given spring material, wire diameter "d" and mean spring diameter "D", may be controlled within limits depending upon the degree of bending of the wire incidental to the coiling of such wire to form the spring, and the degree to which the formed spring is subsequently stressed relieved by a heat treating operation.

Initial tension or preload is an important factor in obtaining a desired spring load at a desired spring length and in changing spring loads for a given spring design without changing wire size, spring diameter, the number of coils and the slope of the spring gradient or spring constant. As by way of example, the full extension for a given tension spring, i.e., that is the extension required to be applied to extend a spring to its highest load without inducing permanent deformation of the spring, may be increased or decreased by changing the initial preload placed in the spring as it is formed. It is also oftentimes desirable to design a tension spring having the lowest spring gradient possible over a certain range of extension, and one way this has been accomplished is to initially wind the spring with maximum pretension. This produces a spring in which substantial spring force is available for use before extension of the spring is initiated and thus the spring may be formed with more coils, while still being fitted within a given space.

An empirical formula developed by Hunter Spring of Hatfield, Pa., a division of Ametek, Inc., from results from springs of various materials and proportions indicates that the greatest amount of initial tension, which can be obtained in a conventionally formed close-wound tension spring, after normal stress relieving, is $$Pi \text{ max.} = \frac{d^3 \times Sy}{5.34 \times D}\left[1 - .39\left(\frac{D}{d}\right)^{\frac{1}{2}}\right]$$

wherein "Sy" is the maximum apparent elastic limit for common spring materials appearing in a publication entitled Spring Design Data, copyright 1964 Ametek, Inc. The maximum apparent elastic limit appears to substantially exceed the actual "elastic limit" of such spring materials, due to certain beneficial- internal stresses produced in the wire, during forming of the spring. The disclosure of this publication is incorporated by reference herein.

SUMMARY OF THE INVENTION

The present invention relates to the manufacture of tension springs and more particularly to tension springs provided with a higher range of maximum initial tension or preloading conditions than previously obtainable.

In accordance with the present invention, a preloaded, close wound tension spring of one hand is formed by reverse winding a conventionally formed open-wound compression spring of opposite hand. Preferable, reverse winding operation is performed under conditions, wherein no or minimum plastic yielding of the spring wire occurs, since reduced values of maximum initial tension in the resulting tension spring will otherwise result. Reverse winding under these conditions may be employed to produce a tension spring having substantially the same mean diameter as the compression spring from which it is formed. However, the invention is not so limited, since it is contemplated that tension springs having mean diameters less than or exceeding those of the compression springs from which same are formed may have utility in that same may still possess higher initial tensions than conventionally formed tension springs of similar spring material, size and wire diameter.

Further, in accordance with the present invention, it is contemplated that tension springs having improved preload properties may be formed by either reverse winding a compression spring outwardly or inwardly upon itself. As an incident to a reverse winding operation, the spring coils may be simply temporarily enlarged or reduced in size by a factor essentially equal to twice the spring wire diameter of the compression spring. However, compression springs having smaller values of the ratio D/d may be successfully rewound without yielding by first decreasing or increasing the diameters of the coils of compression springs prior to performing outwardly and inwardly directed rewinding operations, respectively, thereon.

DETAILED DRAWINGS

DETAILED DESCRIPTION

Figure 1:
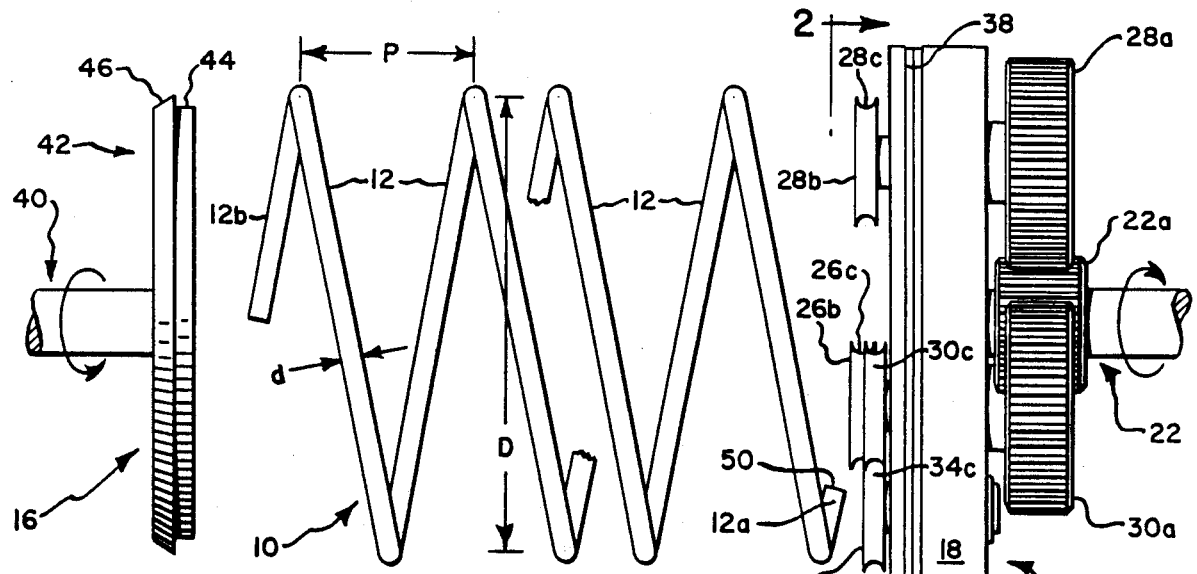
FIG. 1 is a side elevational view of a spring rewinding apparatus used in the practice of the present invention.
Figure 3:
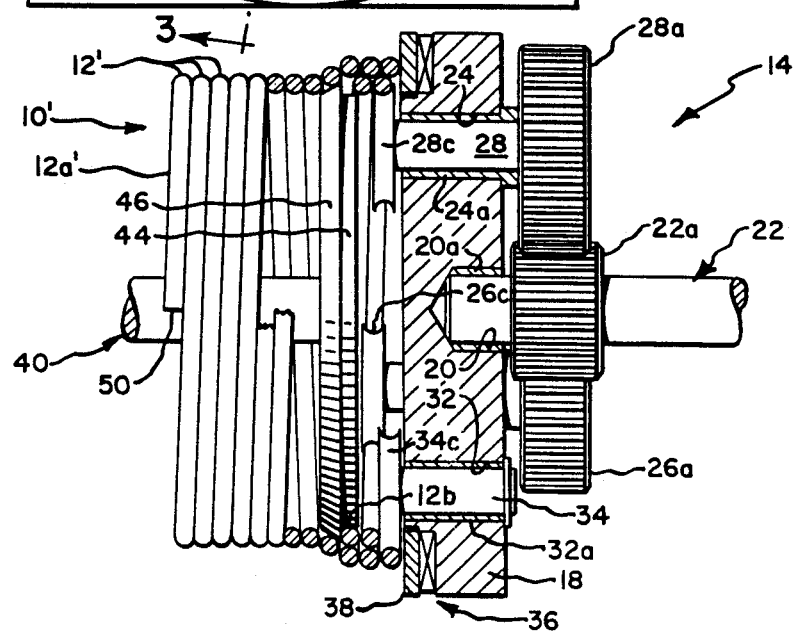
FIG. 3 is a sectional view taken generally along the line 3—3 in FIG. 2.

In accordance with the present invention, an open-wound compression spring 10, which is shown in its as formed configuration in FIG. 1, is subjected to a reverse winding operation to create a preloaded or initially tensioned, close-wound tension spring 10' shown in part in FIG. 3 in the act of its formation. The characteristics desired to be imparted to tension spring 10' will determine the type of spring material employed in forming spring 10; its Index, that is, the ratio of its mean diameter "D" to its wire diameter "d"; its number of coils 12; its pitch "P" or the center to center distance between adjacent coils; and whether the compression spring is heat treated for stress relieving purposes prior to the reverse winding operation.

A presently preferred apparatus for use in forming spring 10' is shown in the drawings as including a winding head 14 and a pusher device 16. Head 14 is defined by a stationary frame 18 having a centrally located blind bore 20, which opens through its rear surface and is sized to receive a bearing sleeve 20a for rotatably supporting one end of a drive shaft 22 fitted with a drive gear 22a. Frame 12 is formed with three through bores 24, only one of which is shown in FIG. 3, which are uniformly annularly spaced apart and arranged equidistant from the axis of bore 20. Bores 24 are fitted with bearing sleeves 24a, only one of which is shown in FIG. 3, for rotatably supporting first, second and third shafts 26, 28, and 30 having gears 26a, 28a and 30a and drive pulley elements 26b, 28b and 30b fixed to their rear and front ends, respectively. As will be apparent from viewing FIG. 2, gears 26a, 28a and 30a are arranged in driven engagement with drive gear 22a, such that upon rotation of drive shaft 22, pulley elements 26b, 28b and 30b are driven for rotation in a desired direction. The direction in which spring 10 is wound determines the relative axial placement of the pulley elements and the direction in which same are driven.

Figure 2:
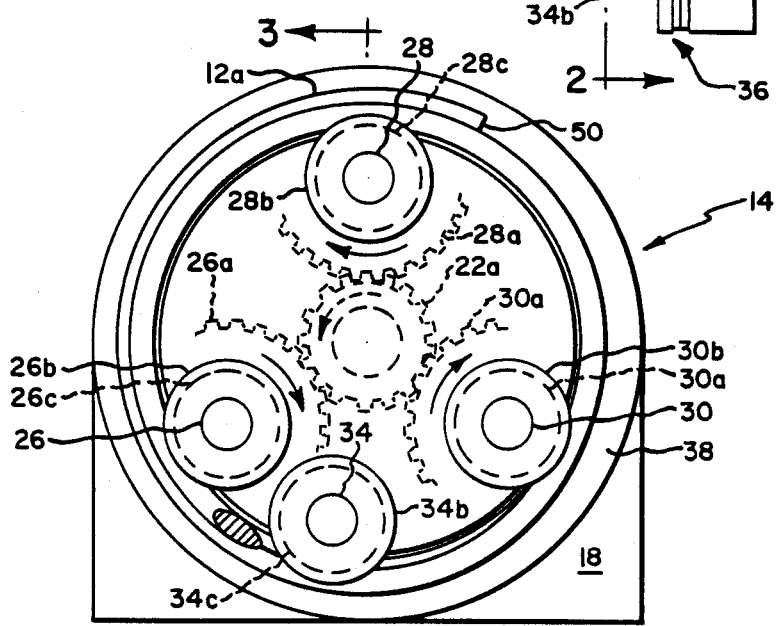
FIG. 2 is a view taken generally along the line 2—2 in FIG. 1.

By making reference to FIGS. 2 and 3, it will be understood that pulley elements 26b, 28b and 30b are radially positioned and sized such that their radially facing, annular drive surfaces 26c, 28c and 30c define an effective diameter sufficient for frictionally engaging with the radially inner surfaces of coils 12 preferably without effecting deformation thereof By reference to FIG. 3, it will also be understood that drive surfaces 26c, 28c and 30c are axially spaced one from another such that they lie along a helix determined by the helix defined by coils 12 when spring 10 is compressed by pusher device 16 sufficiently to bring its adjacent coils into contact. When spring 10 is right hand wound, as shown in the drawings, pulley elements 26b, 28b and 30b constitute lead, intermediate and trailing pulley elements and are arranged in the uniform axially stepped relationship shown in FIGS. 1 and 3, wherein pulley element 26b is spaced furthest from frame 18. For the illustrated construction, the pulley elements would be driven in a clockwise direction, as viewed in FIG. 2.

Frame 18 is also provided with an additional or fourth through bore 32, which is arranged intermediate the shafts 26 and 30 and fitted with a bearing sleeve 32a for rotatably supporting a stub shaft 34 having guide means in the form of a guide pulley element 34b mounted on its front end. Shaft 34 is radially positioned and pulley element 34b sized, such that its radial guide surface 34c is disposed radially outwardly of surfaces 26c, 28c and 30c through a distance preferably essentially equal to wire diameter "d". Surface 34c preferably is arranged in an axial position in which it lies along the helix bisecting surfaces 26c, 28c and 30c, and thus is positioned axially intermediate surface 20c and frame 18, but it is presently anticipated that surface 34c may be aligned or even positioned slightly in front of surface 30c.

By again referring to FIGS. 2 and 3, it will be noted that frame 18 is also fitted with thrust race 36, which includes an annular thrust ring 38 supported for free rotational movement about an axis arranged in alignment with the axis of drive shaft 22. The radial dimension of thrust ring 38 is such that coils 12 engage with such ring after same have passed over guide pulley element 34b. The axial distance or spacing between thrust ring 38 and the center of the portion of drive surface 26c engaged with spring 10 is equal to and preferably slightly less than wire diameter "d".

Pusher device 16 includes a support shaft 40 arranged in co-axial alignment with drive shaft 22 and a disc shaped pusher plate or head 42. Pusher plate 42 has a cylindrically shaped, rear guide portion 44 whose diameter essentially corresponds to the effective diameter defined by drive surfaces 26c, 28c and 30c, that is, the inside diameter of spring 10 defined as "D" minus "d"; and a forwardly inclined, frustoconically shaped, front guide portion 46 having an outer diameter essentially equal the mean spring diameter "D" and inner or smaller diameter essentially equal to inside diameter of spring 10. Pusher device 16 may be supported for free rotational movement, but it is preferably driven for rotation in the direction of rotation of pulley elements 26, 28 and 30. Any suitable means may be provided for driving shafts 22 and 40.

In accordance with the present invention, the leading coil 12a of spring 10 is threaded successively about pulley elements 26b, 28b, 30b and 34b until its free end 50 engages with thrust ring 38, whereafter pusher device guide portion 44 is slid within the trailing coil 12b of spring 10 and pusher device 16 moved towards winding head 14 in order to compress spring 10 sufficiently to place its adjacent coils 12 in surface-to-surface engagement. Thereafter, shaft 22 and preferably shaft 40 are driven, and shaft 40 biased by suitable means, not shown, for movement progressively towards winding head 18 to maintain the coils of spring 10 in a closed state, until such spring is wholly reverse wound to form spring 10'.

The reverse winding operation will be more easily understood by first noting that guide pulley element 34b serves to initiate spreading or enlargement of the diameter of the coils 12 of spring 10 as same pass thereover; and that thrust ring 38 serves to limit the extent of axial movement of the coils towards the right, as viewed in FIGS. 1 and 3. Thus, as free end 50 and successive portions of spring 10 are fed over guide pulley element 34b and into engagement with thrust ring 38 by drive pulley elements 26b, 28b and 30b, such free end and such portions are forced to move radially outwardly and to ride or slide over the outer surface of an adjacent coil trained about pulley elements 26b, 28b and 30b for subsequent movement in a direction away from the thrust ring, as best shown in FIG. 3. As an incident to such movement, the wire forming spring 10 is twisted to produce new coils 12' comprising tension spring 10', which are oppositely wound, e.g., coils 12' have a left hand wind for the case where the coils 12 of spring 10 had a right hand wind. As reverse winding continues, the free end 50 will eventually ride off of trailing coil 12b and into engagement with frusto-conical portion 46, which permits the new leading coil 12a' to resiliently contract until it assumes some predetermined final mean diameter.

In the presently preferred method of forming a tension spring, the compression spring would be heat treated to remove undesired residual stresses, which may interfere with the reverse winding operation, and its characteristics chosen to insure that the wire will be twisted without substantially yielding in order to provide a close wound tension spring having a high preload and a mean diameter essentially equal to the original spring mean diameter "D".

Figure 4:
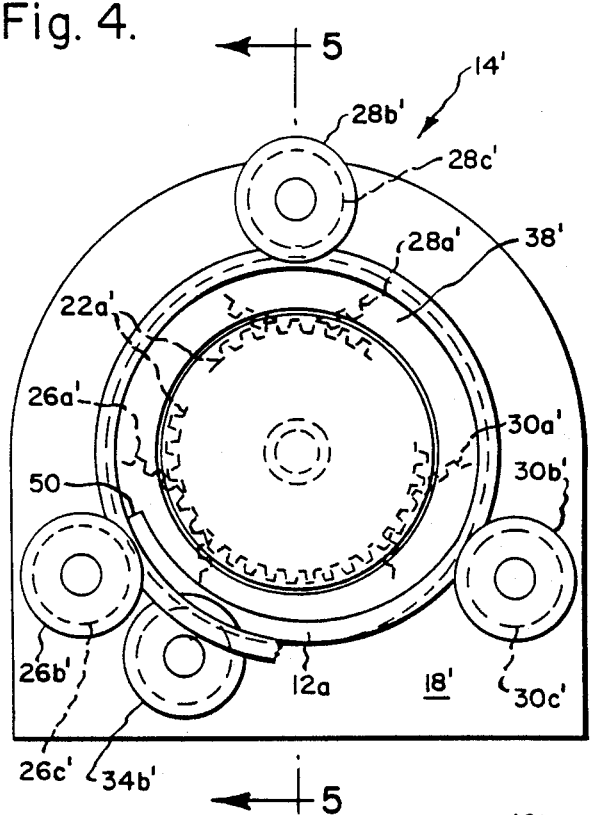
FIG. 4 is a sectional view similar to FIG. 2, but showing an alternative form of the present invention.
Figure 5:
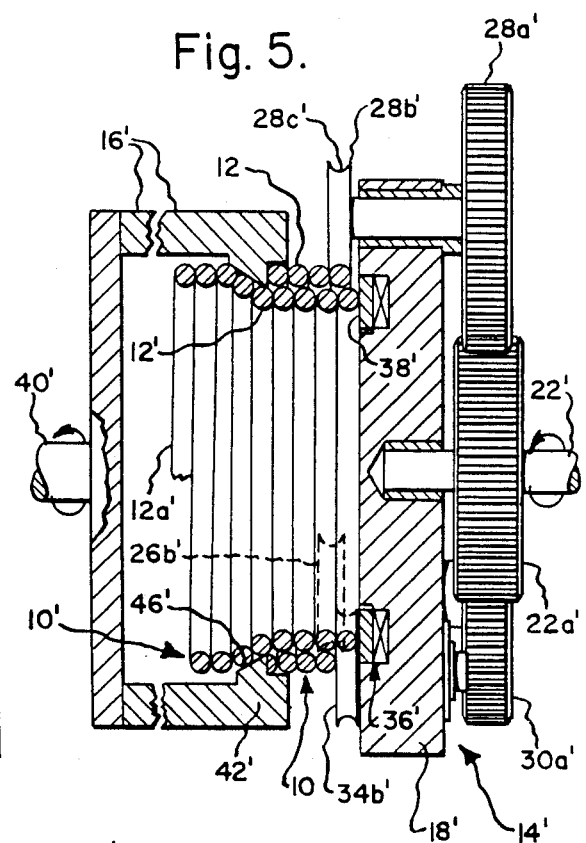
FIG. 5 is a sectional view taken generally along the line 5—5 in FIG. 4.

Reference is now made to FIGS. 4 and 5, which illustrate an alternate form of the present invention, wherein an open-wound compression spring of one hand is wound inwardly upon itself to form a close-wound tension spring of the opposite hand. In that the apparatus of this second embodiment is quite similar to that previously described with reference to FIGS. 1–3, primed numerals will be employed to designate similar elements thereof. Thus, in this apparatus, winding head 14' supports one end of a drive shaft 22' having a gear 22a' arranged to mesh with gears 26a', 28a' and 30a' connected to drive pulley elements 26b', 28b' and 30b' whose drive surfaces 26c', 28c' and 30c' are arranged to frictionally engage with the radially outer surfaces of coils 12 preferably without effecting deformation thereof. Drive surfaces 26c', 28c' and 30c' define lead, intermediate and trailing surfaces, when spring 10 is right hand wound as shown in FIGS. 4 and 5, and lie along a helix defined by coils 12 when the compression spring is axially compressed by pusher device 16' sufficiently to bring such coils into contact with each other. Guide pulley element 34b' may be arranged essentially equidistant from pulley elements 26b' and 30b' in a manner similar to the corresponding pulley elements of the first embodiment of the invention, but it is preferably arranged relatively closer to pulley element 26b', as shown in FIG. 4, so as to reduce the bending stress applied to coils 12 in passing between pulley elements 30b' and 34b'.

As will be apparent from viewing FIGS. 4 and 5, thrust race 36' is arranged radially inwardly of the drive pulley elements, so as to position thrust ring 38' for engagement with coils 12 as same pass over guide pulley element 34b'.

Pusher device 16' is shown in FIG. 5 as including a support shaft 40' serving to support a pusher head 42', having an inner diameter corresponding essentially to the outside diameter of spring 10 and a frusto-conically shaped, front guide portion 46'. Guide portion 46' has a minimum inside diameter corresponding essentially to inner diameter of compression spring 10 and a maximum inside diameter essentially equal to the outside diameter of such spring.

In operation of the embodiment shown in FIGS. 4 and 5, after the leading coil of compression spring 10 is threaded over pulley elements 26b', 28b', 30b' and 34b' and its coils are axially compressed by pusher device 16', reverse winding is effected by driving free end 50 of the leading spring coil and successive portions of the spring into engagement with thrust ring 38', which serves to force successive coils to move radially inwardly and to ride or slide against the inner surfaces of an adjacent coil 12 trained about the pulley elements. As an incident to this deformation of coils 12, new coils 12' of opposite wind comprising spring 10' are formed. As forming of spring 10' progresses, coils 12' ride off or out of spring 10 and slide outwardly along frusto-conical portion 46' until they resiliently expand to assume a mean diameter corresponding essentially to the mean diameter of spring 10. As in the case of the first embodiment of the invention, a compression spring to be inwardly wound upon itself is preferably initially heat treated to remove undesired localized stresses, and its characteristics chosen to permit rewinding to occur without substantial yielding of the spring material. Preferably, yielding is restricted in order to provide tension spring 10' with a mean diameter essentially equal to that of spring 10 and maximize the initial preload imparted to the tension spring.

Figure 6:
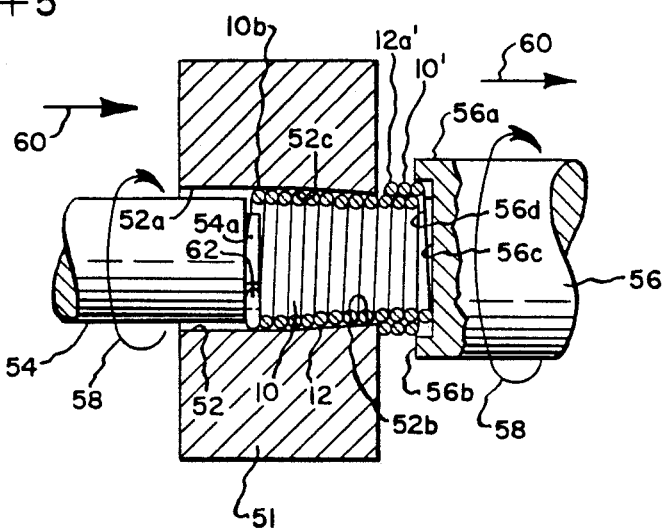
FIG. 6 is a sectional view illustrating second alternative form of the present invention.
Figure 7:
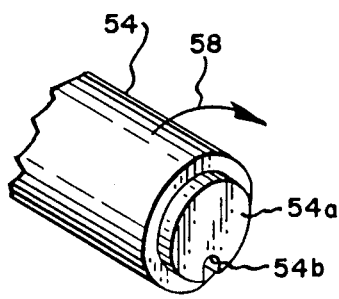
FIG. 7 is a fragmentary perspective view of the left hand arbor shown in FIG. 6.
Figure 8:
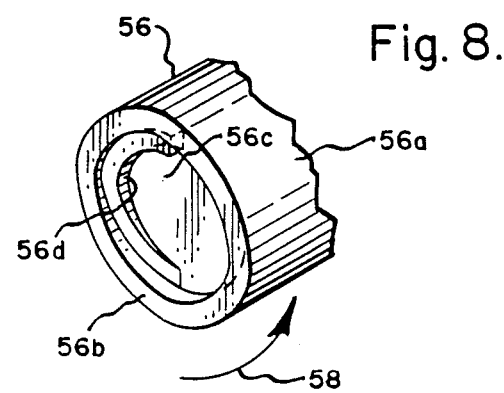
FIG. 8 is a fragmentary perspective view of the right hand arbor shown in FIG. 6.

FIGS. 6–8 illustrate a further embodiment of the invention, wherein an open-wound compression spring 10 of one hand is subjected to radial compression prior to being wound reverse wound outwardly upon itself to define a tension spring 10' of the opposite hand. In this embodiment of the invention, 51 designates a stationary housing formed with a through opening 52 having an inlet end 52a of a diameter essentially equal to or greater than the as-formed outer diameter of a compression spring 10, an outlet end 52b of a diameter less than such as-formed outer diameter, and an intermediate portion 52c of essentially frusto-conical configuration extending between ends 52a and 52b. This embodiment also features the use of a first arbor 54 and a second arbor 56, which are supported for rotation in a common direction determined by the direction of wind of spring 10 and for axial displacements, as indicated by arrows 58 and 60, respectively.

First arbor 54 has a diameter essentially equal to and preferably less than the diameter of outlet end 52b and is formed adjacent its inserted or right hand end, as viewed in FIG. 6, with a generally cylindrical, reduced diameter guide extension 54a serving to define a slot 54b sized to receive a tong 62 carried by trailing spring coil 12b, for purposes of rotatably coupling the first arbor to the trailing coil. The diameter of guide extension 54a is equal to and preferably slightly less than the reduced internal diameter of the coils of spring 10, as same pass through outlet end 52b. Arbor 54 is suitably supported for rotation in a direction opposite to the direction in which spring 10 is wound for purposes of "screwing" the spring 10 into intermediate portion 52c in order to progressively radially compress or reduce the diameter of its coils as they approach outlet end 52b, and for translation towards the right, as viewed in FIG. 6, in order to force the reduced diameter coils outwardly through the outlet end. The diameter of outlet end 52b may be equal to or slightly greater than the internal diameter of spring 10 depending on the degree to which it is desired to compress such spring. Preferably, the outlet end would be sized to compress spring 10 by about one wire diameter "d".

Second arbor 56 is suitably supported for rotation and displacement in axial alignment with outlet end 52b and is formed with an inverting end portion 56a arranged in a facing relation with such outlet end. End portion 56a is best shown in FIG. 8 as being defined by an annular ring portion 56b, a central recessed portion 56c arranged parallel to the ring portion and a ramp or camming portion 56d, which is disposed concentrically inwardly of ring portion 56b and progressively increases in axial thickness or height relative to the surface of central recessed portion 56c in a direction opposite to the direction of rotation of the second arbor. The inner diameter of ring portion 56b preferably corresponds essentially to the diameter of outlet end 52b plus two wire diameters "d", and the ring portion is preferably axially spaced from central recessed portion 56c through a distance essentially equal to or slightly greater than wire diameter "d". Ramp portion 56d has an inner diameter essentially corresponding to the diameter of outlet end 52b and a maximum height, as measured relative to central recessed portion 56c, of essentially one half of wire diameter "d".

In operation of the embodiment of the invention depicted in FIG. 6, second arbor 56 is initially positioned to place ring portion 56b in close proximity to or in actual surface engagement with forming member 51 concentrically of outlet end 52b. Spring 10 is then inserted into through opening 52 and first arbor 54 is rotatably coupled to trailing coil 12b. First arbor 54 is then rotated and moved inwardly of opening 52 for purposes of progressively compressing spring 10 and forcing or feeding its leading end outwardly through outlet end 52b. As the leading coil of spring 10 exits through outlet end 52b into engagement with central recessed portion 52c, it tends to resiliently expand to its initial or as-formed diameter with its leading end arranged for engagement with ramp 56d. As the leading coil expands and the coil next thereto attempts to enter end portion 56a, ramp 56d tends to force the leading coil to move towards outlet end 52b with the result that the leading coil is deformed to define coil 12a' and forced to slide outwardly over its next adjacent coil to initiate forming of tension spring 10'. Thereafter, movement of second arbor 56 to the right, as viewed in FIG. 6, is initiated while such arbor is simultaneously rotated in the direction indicated by arrow 58. The speed of movement of arbor 56 is correlated with the speed at which coils 12 exit through outlet end 52b to ensure that such coils are maintained in axial engagement with one another. As the reverse winding operation continues, leading coil 12a' rides off of trailing coil 12b and onto first arbor 54; the first arbor continuing to axially converge towards end portion 56a until such trailing coil is placed within such end portion to complete the rewinding operation. Rotation of arbor 54 can be relatively slow since its function is to prevent the spring from binding in the bore. Rotation of arbor 56 must be faster and depends on the rate of emergence of the spring from the bore. Arbor 56 must rotate once for every rewound spring turn and move in direction 60 by "d" for every turn to keep the rewound spring confined between block 50 and itself. Arbor 54 moves in direction 60 by the amount required to keep spring 10 compressed coil to coil. Therefore, arbor 54 moves right at slightly more than twice the rate of arbor 56.

Figure 9:
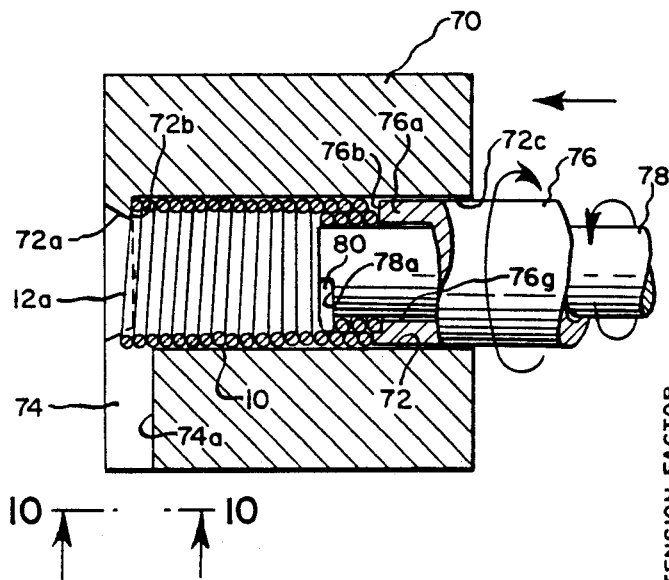
FIG. 9 is a sectional view illustrating a third alternative form of the present invention.

A further embodiment of the invention is shown in FIG. 9, wherein 70 designates a forming member having a cylindrically shaped guide portion or bore opening 72 having a diameter greater than the initial or as-formed outer diameter of a compression spring 10 to be rewound, and an outlet portion 72a having a minimum diameter less than that of the guide portion by an amount essentially corresponding to twice the wire diameter "d" of the spring. Guide portion may have a diameter exceeding the as-formed outer diameter of spring 10 by upwards of two wire diameters, but about one wire diameter is preferred. Outlet portion 72a cooperates with guide portion 72 to define an annular abutment surface 72b, which is inclined and arranged to face towards the opposite or inlet end 72a of the guide portion. A portion of forming member 70 is cut away to form a lot 74 shown in FIGS. 9 and 10, which communicates with guide portion 72 and forms a constraining or second abutment surface 74a to be engaged by the free end of first coil 12a, when spring 10 is fully inserted into forming member 70. Surfaces 74a cooperate with at least a first arbor 76 for purposes of expanding coils 12 of spring 10 into engagement with guide portion 72 and then effecting reverse winding of the spring in the manner to be described. To this end, arbor 76 is sized to be slidably and rotatably received within guide portion 72 and provided with an inverting end portion 76a having a recessed planar surface 76b from which upstands a ramp or camming portion 76c having a spiral shaped radially inner surface 76d. Ramp 76c has a uniform axial length or height above surface 76b corresponding to about one wire diameter "d", and a radial dimension varying from essentially zero at a thin or knife edge end 76e to about one wire diameter "d" adjacent an opposite or enlarged end 76f. Preferably, arbor 76 is formed with an axially extending bore opening 76g for rotatably and slidably receiving a second arbor 78 having a diameter equal to or slightly less than the diameter of guide portion 72 less about four wire diameters. The leading end of second arbor 78 is provided with a slot 78a sized to engage a tong 80 defined by the trailing coil of spring 10.

Figure 11:
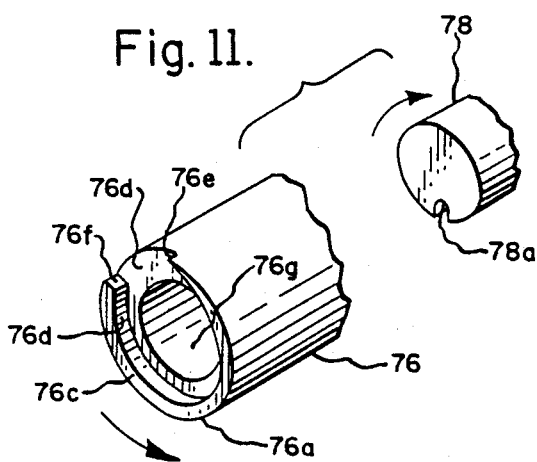
FIG. 11 is a fragmentary perspective view of the arbor construction shown in FIG. 9.
Figure 10:
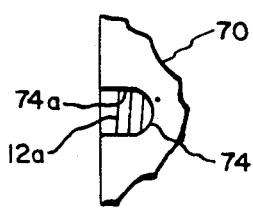
FIG. 10 is a fragmentary view taken generally along the line 10—10 in FIG. 9.

In operation of the embodiment shown in FIGS. 9-11, spring 10 is positioned with guide portion 72 with its leading coil engaged with surfaces 72b and 42a. Thereafter, arbor 76 is inserted within guide portion 72, advanced and rotated opposite the direction in which spring 10 is wound for purposes axially collapsing spring 10 to essentially its solid height, as the trailing end of the spring is turned sufficiently to expand all of coils 12 outwardly into engagement with the guide portion. The trailing coil of the compression spring is rotatably coupled with arbor 76 due to frictional engagement of such coil with ramp inner surface 76d.

When further rotation of the trailing end of the spring is prevented by its engagement with the guide portion 72, it is forced along ramp inner surface 76d and thus reduced in diameter to be able to pass through the expanded spring 10. Further rotation and advancing of arbor 76 causes successive turns to be reduced in diameter. These displace previously reduced turns and the spring is thus reverse wound through its inside. The turns inside wish to expand and bind against the turns outside since more than one inside turn is produced for every outside turn reduced. Resultant binding is prevented by engaging tong 80 with arbor 78 and rotating this arbor in a direction to reduce the diameter of the reverse wound portion, i.e., in a direction opposite to that of arbor 76 and at a speed higher by the ratio of the mean outside and inside diameters.

Figure 12A:
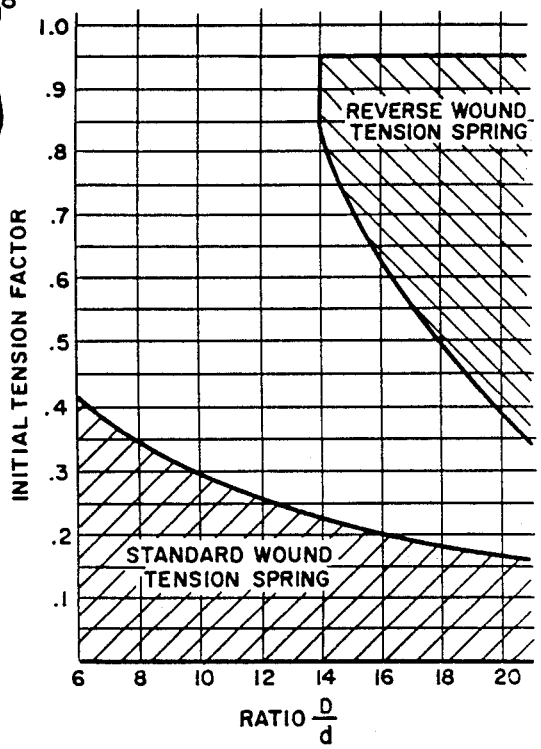
FIGS. 12a and 12b are graphical illustrations plotting the ratio of initial tension factor against the ratio of mean spring diameter to wire diameter.
Figure 12B:
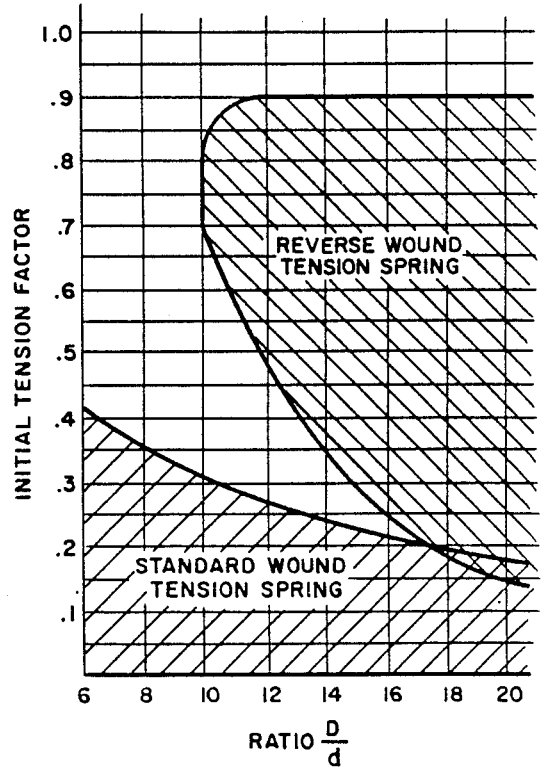

FIGS. 12a and 12b compare initial tension factors obtainable with conventionally wound tension springs and reverse wound tension springs of the resent invention for a relatively low strength spring material, such as phosphorus bronze and a relatively high strength spring material, such as music wire, respectively. The curves approximately represent a situation where the initial tension factor is equal to the ratio Pi/P2, where P2 corresponds essentially to the ultimate load of a spring achievable under use conditions of about 50,000 cycles and for a ratio of (P2−P1)/P2 of about 0.5. P1 is the load applied to a spring when installed. P1 will equal Pi where a spring has all its coils touching when installed for use purposes and will be greater than Pi where the spring is installed in a slightly extended condition. For a reverse wound spring, the theoretical upper limit of possible preload lies at the point where the combined stresses in torsion and bending encountered during a reverse winding operation are just below the apparent yield strength of the spring material. However, preloading to this extent does not permit substantial further stretching of the reverse wound spring during use without yielding and results in low cyclic life. Thus, a preload level should be chosen, such as that at the stress ratio at which the reverse wound spring is intended to operate will provide for an acceptable cyclic life. The upper limit of the envelope of the preload curve illustrated in FIGS. 12a and 12b is not the theoretically obtainable limit for a reverse wound tension spring, which would correspond to an initial tension factor of almost 1.0. Rather, the upper limits depicted in the drawings is meant to approximately illustrate a serviceable upper limit, which allows for a minimum useful measure of extension of a spring during use. The lower limit of possible preload is taken as the preload resulting from reverse winding a compression spring, which is initially wound such that its adjacent coils just touch one another. It may be helpful to consider that for any given value of the ratio D/d, assuming the same spring material, wire diameter and wire configuration, that the value of the initial tension factor for a reverse wound spring will increase within the bounds of the envelopes depicted in FIGS. 12a and 12b at a rate proportional to the pitch or the center-to-center distance between adjacent coils of the compression spring from which it is formed.

Reverse winding can be achieved without yielding for ratios of D above approximately 14 and 12 for the cases of phosphorus bronze and music wire spring materials shown in FIGS. 12a and 12b, respectively. For lower ratios of D/d, progressive yielding of spring material will occur resulting in dimensional changes of the reverse wound spring relative to the compression spring from which it is formed. This lower limit for the ratio D/d for a given spring is determined by the permissible bending stress and elastic modulus of the spring material and the cross-sectional configuration of the spring wire, which, for purposes of FIGS. 12a and 12b, is assumed to be round.

By viewing FIGS. 12a and 12b, it will be appreciated that reverse wound springs formed in accordance with the present invention may be provided with a preload, which lies within a relatively large envelope or range of preloading conditions, wherein the minimum preload condition is greater than the maximum preload condition obtainable for conventionally wound tension spring except for tension springs formed of relatively high strength spring materials lying within the upper normal range of the ratio of D/d.

A plain or single direction reverse winding operation achieved by the apparatus of FIGS. 1–5 is contemplated for use with compression springs having relatively large values of the ratio D/d. As the value of the ratio D/d decreases, it is preferred to reverse wind inwardly through the center of a compression spring by use of the apparatus depicted in FIGS. 4 and 5, since the apparent elastic limit of the spring material is higher when the coil diameter is decreased, during a reverse winding operation. To achieve reverse winding at relatively low values of the ratio D/d, it is required to both expand/contract or contract/expand the coils of a compression spring to their limit of expansion, as the coils pass over one another, since this permits a greater change of coil diameter than that obtainable by a plain reverse winding operation without encountering a yielding condition. Of the alternative embodiments of the invention depicted in FIGS. 6–8, the embodiment of FIGS. 9–11 is preferred to perform this dual direction winding operation.

The presently disclosed methods of forming a tension spring may be departed from in certain instances. As by way of example, there may be advantages in causing yielding of the coils of the tension spring incident to formation thereof, so as to create a tension spring having a diameter differing from that of the compression spring from which it is formed. However, such yielding is expected to result in a reduction in the amount of preload which might otherwise be obtainable. Additionally, it is contemplated that a tension spring may be formed by reverse winding a compression spring coincident with the formation of such compression spring; that is the reverse winding of each coil of such compression spring immediately after the formation thereof.

Further, while several types of apparatus for forming a tension spring by reverse winding a compression spring outwardly or inwardly upon itself has been disclosed, several additional constructions are contemplated. In this respect, it is contemplated that the drive pulley elements of the first embodiment of the invention may be replaced by a screw-like, unitary drive conveyor formed with a helical drive groove on its outer surface. In a like manner, it is contemplated that the drive pulley elements of the second embodiment of the invention may be replaced by a generally cylindrical drive device having a helical drive groove on its inner surface.

The expression "wound upon itself" is used broadly to include situations wherein the coils of the tension spring actually ride on or slide along the coils of the compression spring from which it is formed, as well as the situation in which the coils of the tension spring are supported by a suitable guide arranged radially intermediate the tension and compression springs, during the reverse winding operation. The expression "reverse winding a compression spring" is used broadly to include situations, wherein the coils of a compression spring are reverse wound one at a time, regardless of whether the compression spring is operated upon after or during formation thereof.

I claim:

1. A preloaded, close-wound tension spring of one hand formed by a method including the steps of changing the radial dimension of a compression spring of the opposite hand and then reverse wining said compression spring upon itself in a direction opposite to the direction in which said radial dimension is changed, characterized in that said tension spring has no or comparatively less yield than a tension spring subject to yielding as a result of being formed by reverse winding said compression spring upon itself without first changing the radial dimension thereof in a direction opposite to the direction in which reverse winding occurs.

2. A tension spring according to claim 1, wherein the step of changing said radial dimension involves radially expanding said compression spring.

3. A tension spring according to claim 2, wherein the step of changing said radial dimension involves radially contracting said compression spring.

4. A preloaded, close-wound tension spring of one hand formed by a method including the steps of changing the radial dimension of a compression spring of the opposite hand and then reverse winding said compression spring upon itself in a direction opposite to the direction in which said radial dimension is changed, characterize in that for compression springs of given mean diameter and composition, said tension spring may be formed with a given degree of yield from a compression spring having a greater wire diameter than can a tension spring having said given degree of yield and formed by a method of reverse winding said compression spring upon itself without first changing the radial dimension thereof in a direction opposite to the direction in which reverse winding occurs.

5. A preloaded, close-wound tension spring of one hand formed by a method including the steps of radially expanding a compression spring of the opposite hand and then reverse winding said compression spring radially inwardly upon itself, characterized in that said tension spring has a D/d ratio less than the D/d ratio of a tension spring formed by reverse winding said compression spring inwardly upon itself without first radially expanding said compression spring, for any given degree of yield of the material from which said compression spring is formed, wherein D and d are the mean diameter and wire diameter of said compression spring, respectively.

6. A tension spring according to claim 5, wherein said D/d ratio is equal to or less than 14.

7. A tension spring according to claim 5, wherein there is essentially no yielding of said material.

8. A tension spring according to claim 5, wherein said method includes the additional step of stress relieving said compression spring prior to radial expansion thereof.

9. A preloaded, close-wound tension spring of one hand formed by a method including the steps of radially contracting a compression spring of the opposite hand and then reverse winding said compression spring radially outwardly upwardly itself, characterized in that said tension spring has a D/d less than the D/d ratio of a tension spring formed by reverse winding said compression spring outwardly upon itself without first without first radially contacting said compression spring, for any given degree of yield of the material from which said compression spring is formed, wherein D and d are the mean diameter and wire diameter of said compression spring, respectively.

10. A tension spring according to claim 9, wherein said D/d ratio is equal to or less than 14.

11. A tension spring according to claim 9, wherein there is essentially no yielding of said material.

12. A tension spring according to claim 9, wherein said method includes the additional step of stress relieving said compression spring prior to radial contraction thereof.

* * * * *

UNITED STATES PATENT AND TRADEMARK OFFICE
CERTIFICATE OF CORRECTION

PATENT NO. : 4,836,514

DATED : June 6, 1989

INVENTOR(S) : Otmar M. Ulbing

It is certified that error appears in the above-identified patent and that said Letters Patent is hereby corrected as shown below:

Col. 1, line 36 - "inducing" should be -- producing --.

Col. 3, line 46 - after "thereof", insert a period -- . --

Col. 8, line 3 - "lot" should be -- slot --.

Col. 8, line 59 - "resent" should be -- present --.

Col. 9, line 36 - "D" should be -- D/d --.

Col. 10, line 54 - "wining" should be -- winding --.

Col. 11, line 7 - "characterize" should be -- characterized --.

Signed and Sealed this

Tenth Day of April, 1990

Attest:

HARRY F. MANBECK, JR.

*Attesting Officer*  *Commissioner of Patents and Trademarks*